US011093533B2

(12) United States Patent
Ezen Can et al.

(10) Patent No.: US 11,093,533 B2
(45) Date of Patent: Aug. 17, 2021

(54) VALIDATING BELIEF STATES OF AN AI SYSTEM BY SENTIMENT ANALYSIS AND CONTROVERSY DETECTION

(71) Applicant: International Business Machine Corporation, Armonk, NY (US)

(72) Inventors: Aysu Ezen Can, Cary, NC (US); Brendan Bull, Durham, NC (US); Scott R. Carrier, Apex, NC (US); Dwi Sianto Mansjur, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 15/997,771

(22) Filed: Jun. 5, 2018

(65) Prior Publication Data
US 2019/0370391 A1    Dec. 5, 2019

(51) Int. Cl.
G06F 16/332     (2019.01)
G06F 40/30      (2020.01)
G06N 5/02       (2006.01)
G06N 20/00      (2019.01)
G10L 25/51      (2013.01)

(52) U.S. Cl.
CPC .......... *G06F 16/3329* (2019.01); *G06F 40/30* (2020.01); *G06N 5/02* (2013.01); *G06N 20/00* (2019.01); *G10L 25/51* (2013.01); *G06N 5/022* (2013.01)

(58) Field of Classification Search
CPC ................... G06N 20/00; G06N 5/02
See application file for complete search history.

(56) References Cited

U.S. PATENT DOCUMENTS

| 7,024,368 B1* | 4/2006 | Matheson | G10L 15/22 |
| | | | 704/257 |
| 7,912,701 B1* | 3/2011 | Gray | G06F 17/27 |
| | | | 704/257 |
| 9,471,668 B1 | 10/2016 | Alupului et al. | |
| 9,679,568 B1* | 6/2017 | Taubman | G10L 15/22 |
| 9,898,170 B2 | 2/2018 | Bufe et al. | |
| 10,482,874 B2* | 11/2019 | Thomson | G10L 15/1822 |
| 10,546,066 B2* | 1/2020 | Li | G06N 7/005 |

(Continued)

OTHER PUBLICATIONS

Mrkšić, Nikola, et al: "Neural belief tracker: Data-driven dialogue state tracking." arXiv preprint arXiv: 1606.03777, 2016. (Year: 2016).*

(Continued)

*Primary Examiner* — Daniel C Washburn
*Assistant Examiner* — Oluwadamilola M Ogunbiyi
(74) *Attorney, Agent, or Firm* — Cuenot, Forsythe & Kim, LLC

(57) ABSTRACT

Validating belief states of an artificial intelligence system includes providing a question answering service; detecting a negative sentiment of a user to an answer transmitted to a device associated with the user; and responsive to detecting the negative sentiment, detecting that the answer relates to a topic on which there is controversy. Next, a new belief state is added to the question answering service based on the controversy, and an updated answer is transmitted to the device, wherein the updated answer is based on the new belief state.

20 Claims, 4 Drawing Sheets

(56) References Cited

U.S. PATENT DOCUMENTS

| | | | |
|---|---|---|---|
| 2004/0010492 A1* | 1/2004 | Zhao | H04W 40/04 |
| 2007/0203693 A1* | 8/2007 | Estes | G06N 5/022 |
| | | | 704/9 |
| 2008/0010225 A1* | 1/2008 | Gonsalves | G06N 7/005 |
| | | | 706/11 |
| 2008/0016020 A1* | 1/2008 | Estes | G06N 5/022 |
| | | | 706/52 |
| 2008/0183652 A1* | 7/2008 | Profio | G06N 7/005 |
| | | | 706/47 |
| 2009/0030683 A1* | 1/2009 | Williams | G10L 15/22 |
| | | | 704/236 |
| 2011/0010164 A1* | 1/2011 | Williams | G10L 15/063 |
| | | | 704/9 |
| 2011/0055121 A1* | 3/2011 | Datta | G06F 19/3418 |
| | | | 706/12 |
| 2012/0290509 A1* | 11/2012 | Heck | G10L 15/06 |
| | | | 706/11 |
| 2013/0159340 A1* | 6/2013 | Blanco | G06F 16/9535 |
| | | | 707/769 |
| 2014/0156268 A1* | 6/2014 | Arizmendi | G10L 15/1822 |
| | | | 704/231 |
| 2014/0257794 A1* | 9/2014 | Gandrabur | G10L 15/1815 |
| | | | 704/9 |
| 2014/0330554 A1* | 11/2014 | Williams | G10L 15/063 |
| | | | 704/9 |
| 2015/0228275 A1* | 8/2015 | Watanabe | G10L 15/142 |
| | | | 704/275 |
| 2015/0363393 A1* | 12/2015 | Williams | G10L 15/22 |
| | | | 704/8 |
| 2016/0163311 A1* | 6/2016 | Crook | G10L 15/183 |
| | | | 704/275 |
| 2016/0171062 A1* | 6/2016 | Bufe | G06F 16/9535 |
| | | | 707/722 |
| 2016/0171387 A1 | 6/2016 | Suskind | |
| 2016/0342683 A1 | 11/2016 | Lim et al. | |
| 2017/0018271 A1* | 1/2017 | Khan | G10L 15/32 |
| 2017/0243382 A1* | 8/2017 | Banerjee | G06T 11/206 |
| 2017/0251985 A1* | 9/2017 | Howard | A61B 5/11 |
| 2017/0270929 A1* | 9/2017 | Aleksic | G10L 15/26 |
| 2017/0277791 A1* | 9/2017 | Bai | G06F 16/951 |
| 2018/0005333 A1* | 1/2018 | Endo | G16H 50/20 |
| 2018/0068657 A1* | 3/2018 | Khan | G06F 17/2785 |
| 2018/0075335 A1* | 3/2018 | Braz | G06F 16/24522 |
| 2018/0075847 A1* | 3/2018 | Lee | G06F 16/3329 |
| 2018/0090131 A1* | 3/2018 | Mangalath | G10L 15/142 |
| 2018/0173699 A1* | 6/2018 | Tacchi | G06F 16/358 |
| 2018/0226076 A1* | 8/2018 | Kotti | G10L 15/22 |
| 2018/0232435 A1* | 8/2018 | Papangelis | G10L 15/063 |
| 2018/0233143 A1* | 8/2018 | Papangelis | G06F 16/3329 |
| 2018/0329998 A1* | 11/2018 | Thomson | G06F 16/9535 |
| 2018/0330721 A1* | 11/2018 | Thomson | G10L 15/1815 |
| 2018/0341535 A1* | 11/2018 | Sharma | G06F 11/0721 |
| 2018/0357239 A1* | 12/2018 | Alonso | G06F 16/3344 |
| 2019/0012371 A1* | 1/2019 | Campbell | G06F 16/3329 |
| 2019/0115027 A1* | 4/2019 | Shah | G10L 15/30 |
| 2019/0120649 A1* | 4/2019 | Seok | G01C 21/3629 |
| 2019/0278792 A1* | 9/2019 | Campbell | G10L 15/22 |
| 2019/0355353 A1* | 11/2019 | Shin | G10L 15/22 |

OTHER PUBLICATIONS

Walker, M.A., "An application of reinforcement learning to dialogue strategy selection in a spoken dialogue system for email," Journal of Artificial Intelligence Research, Jun. 1, 2000, vol. 12, pp. 387-416.

Lemon, O. et al., "An ISU dialogue system exhibiting reinforcement learning of dialogue policies: generic slot-filling in the Talk in-car system," In Proc. of the 11th Conf. of the European Chapter of the Association for Computational Linguistics: Posters & Demonstrations, Apr. 5, 2006, pp. 119-122.

Singh, S.P. et al., "Reinforcement learning for spoken dialogue systems," In Advances in Neural Information Processing Systems, 2000, pp. 956-962.

Singh, S. et al., "Optimizing dialogue management with reinforcement learning: Experiments with the NJFun system," Journal of Artificial Intelligence Research, Feb. 1, 2002 vol. 16, pp. 105-133.

Scheffler K. et al., "Automatic learning of dialogue strategy using dialogue simulation and reinforcement learning," In Proc. of the 2nd Int'l. Conf. on Human Language Technology Research, Mar. 24, 2002, pp. 12-19, Morgan Kaufmann Publishers Inc.

Rodriguez, A.C. et al., "Reinforcement learning using approximate belief states," In Advances in Neural Information Processing Systems, 2000, pp. 1036-1042.

Kumar, A. et al., "Ask me anything: Dynamic memory networks for natural language processing," In Int'l. Conf. on Machine Learning, Jun. 11, 2016, pp. 1378-1387.

Thomson, B. et al., "Bayesian update of dialogue state: A POMDP framework for spoken dialogue systems," Comput. Speech Lang., Oct. 2010, vol. 24, No. 4, 562-588.

Gašić, M. et al., "Effective handling of dialogue state in the hidden information state POMDP-based dialogue manager," ACM Trans. on Speech and Language Processing (TSLP), May 1, 2011, vol. 7, No. 3, 28 pg.

Tsytsarau, M. et al., "Scalable discovery of contradictions on the web," In ACM Proc. of the 19th Int'l. Conf. on World Wide Web, Apr. 26, 2010 pp. 1195-1196.

Preum, S.M. et al., "Preclude: Conflict detection in textual health advice," In IEEE Int'l. Conf. on Pervasive Computing and Communications (PerCom), Mar. 13, 2017, pp. 286-296.

* cited by examiner

VALIDATING BELIEF STATES OF AN AI SYSTEM BY SENTIMENT ANALYSIS AND CONTROVERSY DETECTION

BACKGROUND

The present invention relates to open-domain question answering (QA) systems, and more specifically, to validating the belief states of a QA system.

With the increased usage of computing networks, such as the Internet, humans are currently inundated with the amount of information available from various structured and unstructured sources. However, information gaps are prevalent as users try to piece together relevant information that they can find during the information searches on various subjects. To facilitate such information searches, recent research is directed to generating question-answering (QA) systems that may take a user inputted question, analyze it, and return results indicative of the most probable answer or answers to the input question. QA systems provide automated mechanisms for searching through large sets of sources of data (e.g., electronic documents) and analyzing the data with regard to the input question to process/determine one or more answers to the user question.

SUMMARY

A method includes providing, by a computer, a question answering service; detecting, by the computer, a negative sentiment of a user to an answer transmitted by the computer to a device associated with the user; responsive to detecting the negative sentiment, detecting, by the computer, that the answer relates to a topic on which there is controversy; adding, by the computer, a new belief state to the question answering service based on the controversy; and transmitting, by the computer, an updated answer to the device, wherein the updated answer is based on the new belief state.

A system includes a processor programmed to initiate executable operations. In particular, the executable operations include providing a question answering service; detecting a negative sentiment of a user to an answer transmitted by the system to a device associated with the user; responsive to detecting the negative sentiment, detecting that the answer relates to a topic on which there is controversy; adding a new belief state to the question answering service based on the controversy; and transmitting an updated answer to the device, wherein the updated answer is based on the new belief state.

A computer program product includes a computer readable storage medium having program code stored thereon. In particular, the program code is executable by a data processing system to initiate operations including: providing, by the data processing system, a question answering service; detecting, by the data processing system, a negative sentiment of a user to an answer transmitted by the data processing system to a device associated with the user; responsive to detecting the negative sentiment, detecting, by the data processing system, that the answer relates to a topic on which there is controversy; adding, by the data processing system, a new belief state to the question answering service based on the controversy; and transmitting, by the data processing system, an updated answer to the device, wherein the updated answer is based on the new belief state.

DETAILED DESCRIPTION

Figure 1:
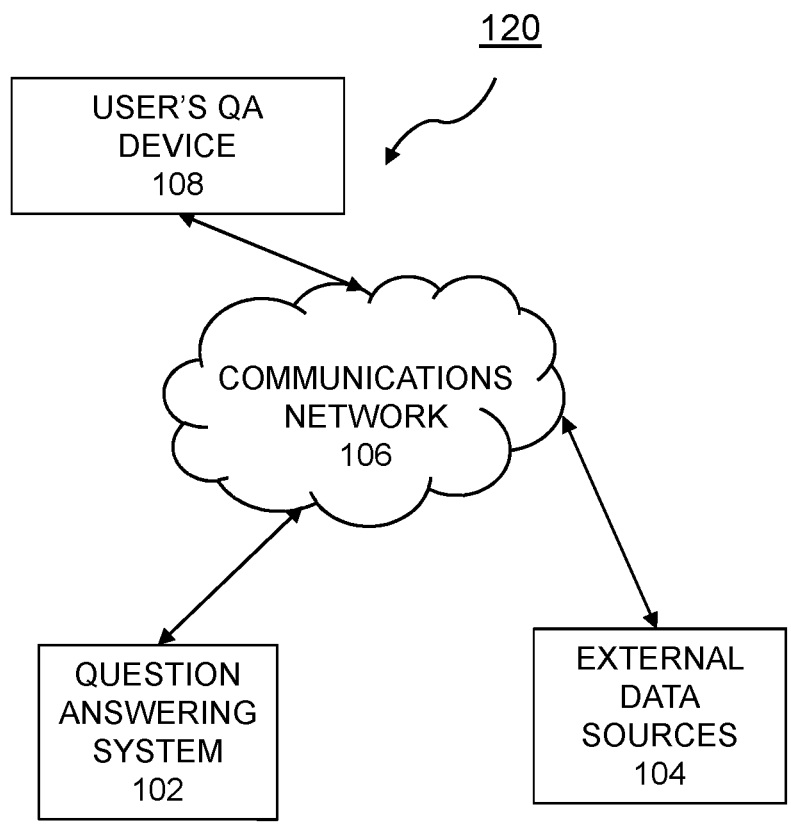
FIG. 1 is a block diagram illustrating an example of a network data processing system in accordance with the principles of the present disclosure.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

The terms "question answering system" and "dialogue system" are used interchangeably herein and the term "question answering service" refers to the executable software and accompanying data that enable the providing of a question answering dialogue by the question answering system.

For question-answering systems to work accurately with high user satisfaction, those systems should understand user intentions. One of the tasks that is involved in revealing user intentions is decomposing user utterances/questions into pieces that are meaningful for an AI-supported system. The better the system understands a question, the more likely the answer will be relevant and useful. Therefore, instead of assuming that a question is fully understood and generating responses based on an assumption, one way for the AI-system to improve its dialogue capabilities over time is to accept that the way the system understood the question might not be correct. This notion of possibility of an error in question understanding introduces uncertainty to AI-system. User utterances are certain but the knowledge representation that those utterances map to in the AI-system are uncertain.

Embodiments in accordance with the principles of the present disclosure contemplate a QA system, or dialogue system, in which the dialogue can be modeled as Partially Observable Markov Decision Processes (POMDPs). Additional details about this type of dialogue system can be found in current literature on the subject such as "*Bayesian update of dialogue state: A POMDP framework for spoken dialogue systems*" (Blaise Thomson and Steve Young. 2010. *Comput.*

*Speech Lang.* 24, 4 (October 2010), 562-588.) and *"Effective handling of dialogue state in the hidden information state POMDP-based dialogue manager"* (Milica Gašić and Steve Young. 2011. *ACM Trans. Speech Lang. Process.* 7, 3, Article 4 (June 2011), 28 pages.).

Reinforcement learning (RL) is a machine learning technique for AI-based systems to take actions that maximize rewards. Partially Observable Markov Decision Processes (POMDPs) that represent states, actions, transitions between states and actions as well as rewards for each transitions can be utilized for RL. The goal is to find a policy that maps belief states to actions where a belief state is a probability distribution over all states. The notion of "regret" in RL is useful with a dialogue system, where previous system responses can be improved to obtain better rewards in the rest of the dialogue.

Embodiments in accordance with the principles of the present disclosure validate how well a question answering system understands user intent and determines the dialogue path based on the user intent. Using sentiment analysis can reveal points in the dialogue where the user starts feeling dissatisfied with the system or discontent with the answers. Then utilizing controversy detection, analysis can be performed to determine if the topic in discussion has controversial, contradictory, or conflicting sides. If there are controversial sides, an answer can be provided from the other side of the argument as an alternative answer as a way to remedy the user's dissatisfaction. While updating the answer, reinforcement learning techniques can be applied to the dialogue states in order to change the belief state where a belief state represents what system believes the user asked for.

Conventional reinforcement learning requires the set of belief states to be pre-defined and those states do not change over time. Embodiments in accordance with the present disclosure can use controversy detection to generate new belief states and to expand the dialogue strategy search over time based on user utterances.

In general, dialogue systems that utilize reinforcement learning are for task-oriented systems that apply slot-filling to further move along the dialogue. Systems and methods described herein, however, use reinforcement learning in a question-answering system with a growing set of belief states. Thus, the present system is more complex than simple slot-filling where there is a finite number of slots to be filled and corresponding finite number of system moves to those slots.

Also, conventional dialogue systems that utilize reinforcement learning require explicit action from the user indicating that the system's response is wrong (e.g., paraphrasing the question, explicitly confirming the answer was wrong). In contrast, embodiments in accordance with the principles of the present disclosure contemplate automatically understanding that the users are getting less satisfied with the answers by utilizing sentiment analysis. Automatically recognizing that a user is feeling discontent via sentiment analysis enables the system to re-evaluate the belief state that was used to answer the question that lead to dissatisfaction, and therefore, better evaluate how well the system understood the user's question.

In practice, embodiments in accordance with the principles of the present disclosure can be run in a spoken dialogue system where each user utterance is treated as a question to be answered. The inclusion of sentiment analysis and controversy detection would be incorporated in a natural language processing pipeline where user utterances are analyzed to understand intentions and relevant responses are generated. The resulting system updates its answers within the bounds of what it could reasonably be expected to understand in addition to adding new belief states for controversial questions.

FIG. 1 is a block diagram illustrating an example of a network data processing system 120 that includes a communication network 106. The communication network 106 is the medium used to provide communications links between various devices and data processing systems connected together within the computing environment (or network data processing system, etc.) 120. The communication network 106 may include connections, such as wire, wireless communication links, or fiber optic cables. The communication network 106 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

One device in the network data processing system 120 is a user's question-answering (QA) device 108. This device may have a microphone or other user interface element for the user to provide a question. For example, the user may speak an utterance and the user's QA device 108 will capture that utterance as a digital file that represents the sounds that were spoken. The user's QA device 108 can then transmit the digital file via the communications network 106 to a question answering (QA) system 102. In turn, the QA system 102 returns an answer which the user's QA device 108 conveys to the user.

One example QA system is the Watson™ system that is available from the International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA technology used for hypothesis generation, massive evidence gathering, analysis, and scoring. DeepQA analyzes a user question, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and abased on trained models, performs a final merging and ranking to output an answer to the input question.

In embodiments in accordance with the principles of the present disclosure, the QA system 102 can be implemented, in part, on a foundation of technology similar to that employed in International Business Machines' Watson™ Jeopardy pipeline. One of ordinary skill will recognize that other similar techniques and systems can be employed as well. In general, a system in accordance with embodiments of the present disclosure can be incorporated in a natural-language processing pipeline that includes:

Using natural-language processing (NLP) to parse a user's utterance and extract keywords to determine what question is being asked, Using information retrieval techniques against structured and unstructured data sources to create candidate answers, Using rules and logic to winnow down the field of candidates, Using machine learning techniques to score the candidates, and Delivering the highest scoring candidate as the answer.

Other example QA platforms, or pipelines, are described in detail in U.S. Pat. Nos. 9,471,668 and 9,898,170, both assigned to International Business Machines Corp, and incorporated herein by reference in their entirety. The example dialogue systems described herein include spoken dialogue systems in which the questions and answers are audible. However, other means of conveying either a question or an answer, or both, are also contemplated such as, for example, by text, text-to-speech, speech-to-text, etc.

Also shown in FIG. 1 are external data sources 104. This block represents the myriad available data sources that the QA system 102 may mine for structured and unstructured data.

Figure 2:
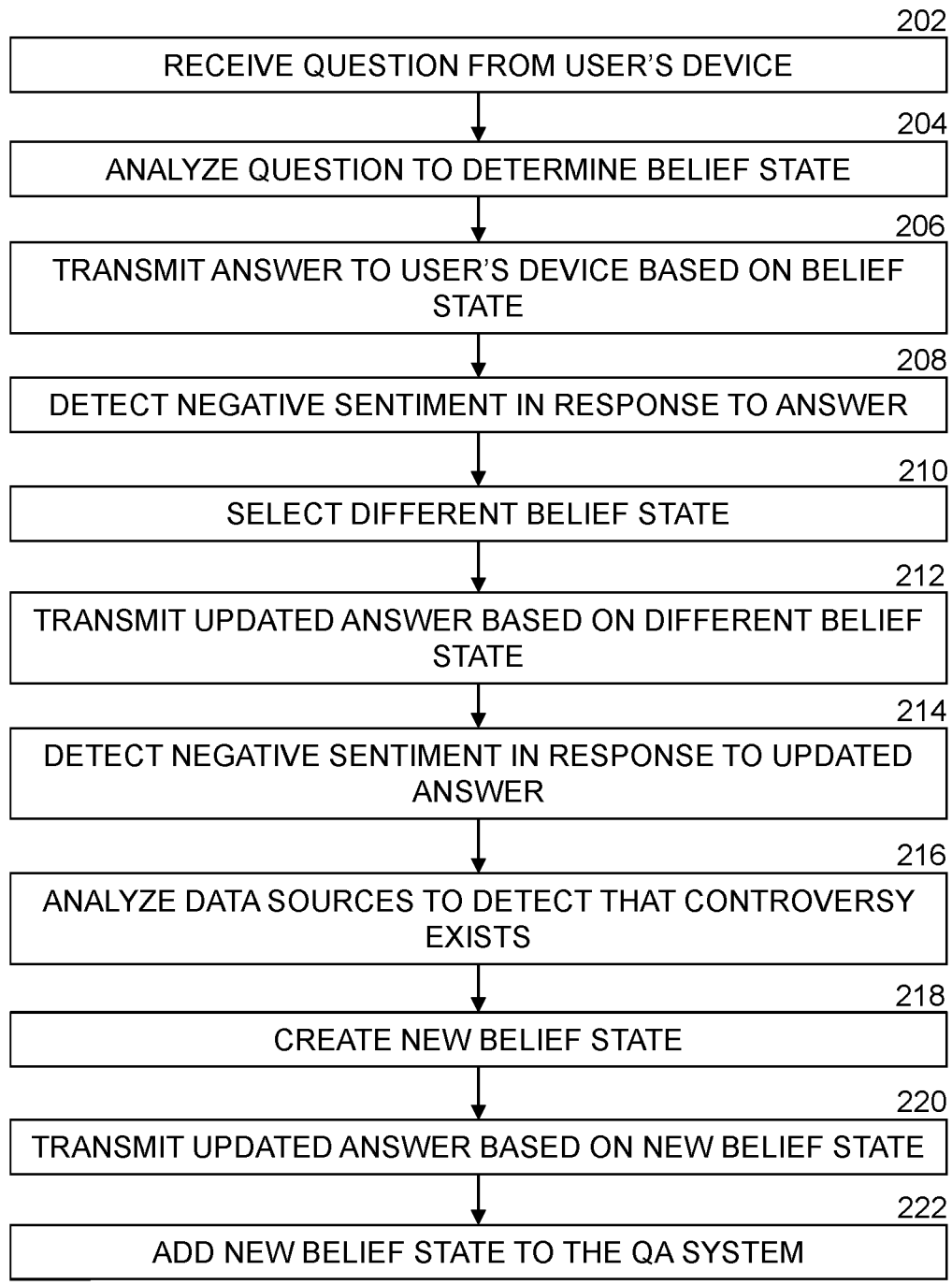
FIG. 2 is a flowchart illustrating an example methods of providing a dialogue system or service, in accordance with the principles of the present disclosure.

FIG. 2 is a flowchart illustrating an example method of providing a dialogue system or service, in accordance with the principles of the present disclosure. In step 202, a conversation or dialogue begins with the QA system receiving a statement from the user which the QA system treats as a question. As is well understood by those of ordinary skill, the QA system, in step 204, analyzes the question to determine a dialogue state or belief state. A belief state represents what the system believes the user asked for. Because language and the artificial intelligence analysis of language are not always precise, the system may determine that there are two (or more) potential belief states that represent what the user may be asking for. There is typically a confidence score or probability associated which each potential belief state and the belief state with the highest confidence may be chosen.

In step 206, the QA system formulates an answer based on the belief state and transmits that answer to the user's QA device. Either the user will be satisfied with the answer or not. The user will typically provide a feedback response either ending the dialogue or expressing negative sentiment towards the answer.

The feedback response is provided by the user's QA device to the QA system and the QA system, in step 208, detects an instance in which the user's response towards the supplied answer is negative.

Opinion mining, also known as sentiment analysis or emotion AI, refers to the use of natural language processing, text analysis, and computational linguistics to systematically identify, extract, quantify, and study affective states and subjective information. Sentiment analysis is widely applied to voice of the customer materials such as reviews and survey responses, online and social media, and healthcare materials for applications that range from marketing to customer service to clinical medicine.

Generally speaking, sentiment analysis aims to determine the attitude of a speaker, writer, or other subject with respect to some topic or the overall contextual polarity or emotional reaction to a document, interaction, or event. The attitude may be a judgment or evaluation (e.g., appraisal theory), affective state (i.e., the emotional state of the author or speaker), or the intended emotional communication (i.e., the emotional effect intended by the author or interlocutor).

Existing approaches to sentiment analysis can be grouped into three main categories: knowledge-based techniques, statistical methods, and hybrid approaches. Knowledge-based techniques classify text by affect categories based on the presence of unambiguous affect words such as happy, sad, afraid, and bored. Some knowledge bases not only list obvious affect words, but also assign arbitrary words a probable "affinity" to particular emotions. Statistical methods leverage on elements from machine learning such as latent semantic analysis, support vector machines, "bag of words" and Semantic Orientation Pointwise Mutual Information. To mine the opinion in context and get the feature about which the speaker has opined, the grammatical relationships of words are used. Grammatical dependency relations are obtained by deep parsing of the text. Hybrid approaches leverage on both machine learning and elements from knowledge representation such as ontologies and semantic networks in order to detect semantics that are expressed in a subtle manner, e.g., through the analysis of concepts that do not explicitly convey relevant information, but which are implicitly linked to other concepts that do so.

One of ordinary skill will recognize that any of a wide variety of known techniques and algorithms for performing sentiment analysis are contemplated in the present disclosure in order to determine whether the user is satisfied with the supplied answer or not. If the user is satisfied with the supplied answer, then the system can wait for a new conversation.

However, if negative sentiment towards the supplied answer is detected, then a determination is made, in step 210, to select one of the other potential belief states that had a lower confidence score that the originally selected belief state. Accordingly, in step 212, an updated answer can be formulated based on the different belief state and then transmitted by the QA system to the user's QA device.

As before, either the user will be satisfied with the updated answer or not. The user will typically provide a feedback response either ending the dialogue or expressing negative sentiment towards the updated answer. If the feedback is positive then the reinforcement learning algorithms, noted above, can be updated.

This feedback response is provided by the user's QA device to the QA system and the QA system, in step 214, detects an instance in which the user's response towards the updated answer is negative. Control then passes to step 216 in which a determination is made by the QA system as to whether there is conflict or controversy surrounding the subject matter of the question.

In step 216, the system can determine if there is controversy or conflict with respect to the subject matter of the user's question. Controversy detection refers to when there are data sources that have conflicting or contradicting information compared to each other and compared to the answer provided to the user by the system. For example, a diet-related website might suggest increasing intake of kale while an online article on digestive health may suggest that heavy consumption of cruciferous vegetables can lead to hypothyroidism. Because kale is a cruciferous vegetable, controversy or conflict exists regarding the subject of consuming kale.

Controversy can be detected in a variety of different ways. The question answering system, for example, may have a knowledge base that already has stored information that identifies one or more topics as controversial. Documents themselves may internally note that they pertain to a controversial topic on which there is disagreement. One simple proposed method of automatically detecting controversy is to search for answers that are the negative of what the question answering system provided. For example, if the question is thought to be "Are doughnuts toxic to dogs?" and the answer provided was "Doughnuts are toxic to dogs", then searching for documents or content that contend that doughnuts are safe or non-toxic for dogs would either find such conflicting content or not. If conflicting content is uncovered, then the system determines that controversy has been detected. In this example, the opposite or contrary semantic content to that of the provided answer is used to find if there is content that supports the contrary opinion.

The term "contrary" can include opinions that vary by degree or additional factors. For example, the answer of "carbohydrates are good to include in your diet" (without any qualification) is considered contrary to "no more than 150 grams of carbohydrates should be consumed daily". As another example, the answer of "a blood pressure of 140/90 is acceptable" is considered contrary to "a blood pressure of 140/90 is acceptable unless you are pregnant".

Also, there has been research into more sophisticated techniques for automatic, computer-driven detection of controversy for a given topic. Embodiments in accordance with the principles of the present disclosure contemplate utilizing such automatic detection techniques and algorithms as part of providing a question answering system. Additional details about automatic methods for detecting controversy or conflict between multiple sources on a topic can be found in current literature on the subject such as "Scalable discovery of contradictions on the web" (Mikalai Tsytsarau, Themis Palpanas, and Kerstin Denecke. 2010. In Proceedings of the 19th international conference on World wide web (WWW '10). ACM, New York, N.Y., USA, 1195-1196.) and *"Preclude: Conflict Detection in Textual Health Advice"* (Sarah M. Preum, Md Abu Sayeed Mondol, Meiyi Ma, Hongning Wang, and John A. Stankovic. 2017. In Pervasive Computing and Communications (PerCom), 2017 IEEE International Conference on. IEEE.).

Because the user has provided negative sentiment to the updated answer, the user is likely trying to determine if a different, possibly conflicting, answer exists. Upon the QA system determining controversy does exist, the content that was identified that supports that determination can be analyzed by the system to determine what question or questions the content is helpful in answering. This question is used by the system to add a new, not-previously-existing belief state to the QA system, in step 218. Unlike step 210 where an existing (but different) belief state is selected, in step 218 a new belief state is added and, thus, additional belief states are now available in the QA system that can be used in the present, and any future, dialogues. Accordingly, in step 220, an updated answer can be formulated based on the newly created belief state and then transmitted by the QA system to the user's QA device. The newly created belief state is added, in step 222, to the QA system and the reinforcement learning algorithms can be updated to reflect the new belief state as well.

In the example flowchart of FIG. 2, the new belief state was created after negative sentiment was detected twice and then controversy was detected. One of ordinary skill will recognize that the choice to detect for controversy could have been made after detecting the negative sentiment the first time without departing from the scope of the present disclosure. Alternatively, more than two potential belief states might have been identified with confidence scores above a threshold value. The QA system may exhaust all of those belief states before deciding to perform controversy detection.

Figure 3:
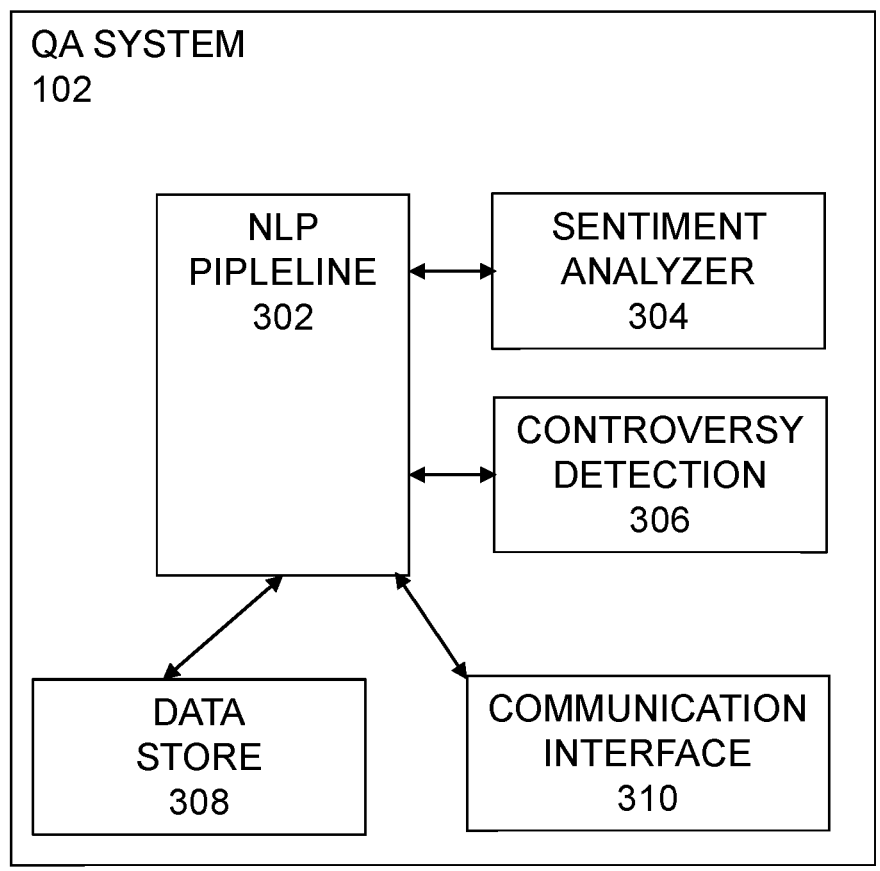
FIG. 3 is a block diagram of a question answering system in accordance with the principles of the present disclosure.

FIG. 3 is a block diagram of a question answering system 102 in accordance with the principles of the present disclosure. As mentioned above, and described with respect to FIG. 2, the QA system 102 employs an NLP pipeline 302. The functionality of the sentiment analyzer 304 and the controversy detection 306 are inserted in the NLP pipeline 302 as appropriate. The sentiment analyzer 304 analyzes user feedback that is a response to an answer provided during the dialogue. The sentiment analyzer 304 automatically determines when negative sentiment is present and can change a selected belief state of the QA system in order to provide an updated answer based on the different belief state selected.

In some instances, after negative sentiment is detected, controversy detection 306 can occur. If a topic of the dialogue is determined to likely be controversial, then a new belief state can be generated. In some instances, the new belief state is opposite or contrary, semantically, to a previously selected belief state that resulted in negative sentiment from the user. A data store 308 is provided that stores the models, data, and software that enable the QA system 102 to provides its functionality of carrying-on a dialogue with a user. The communication interface 310 allows bi-directional communication to occur between the QA system 102 and a user's QA device.

Below are example dialogues that show how embodiments in accordance with the principles of the present disclosure may conduct a question-answering dialogue session. Initially, the question from the user is analyzed and there are two possible belief states that could be reached. As mentioned above, a belief state represents what the system believes the user asked for. An answer based on the mostly likely belief state is conveyed to the user. In both examples, the system automatically detects negative sentiment towards the first answer and selects the alternative belief state in order to provide an updated answer. In the second example, however, the updated answer also results in negative sentiment towards the updated answer being detected by the QA system. Under these circumstances, the QA system automatically determines if there is controversy regarding the updated answer that was provided. The QA system determines what available data sources, or content, disagrees with the updated answer. The QA system uses this conflicting content to generate a new belief state that is added to the QA system and the new belief state is used to generate another updated answer that is provided to the user.

| 1. Example dialogue without controversy: | |
| --- | --- |
| User: | In a low-carb diet, can I eat English muffin? |
| System: | |
| Two potential belief states: | |
| 1) "English muffin" or | |
| 2) "amount of bread in low-carb diet" | |
| Chosen belief state: | |
| "English muffin" | |
| System: | English muffin is a type of round and thin bread. |
| User: | You don't seem to have done your best job. |
| System: | |
| negative sentiment detected | |
| change of belief state to other alternative: | |
| 2) "amount of bread in low-carb diet" | |
| System: | 100-150 grams of carbohydrate per day constitutes a low-carb diet. |
| User: | Sounds good. Let me start counting my carbohydrate then. |
| 2. Example dialogue with controversy: | |
| User: | Do you think I can eat as many eggs as I want? |
| System: | |
| Two potential belief states: | |
| 1) "benefit of eating eggs" or | |
| 2) "amount of eggs to be eaten" | |
| Chosen belief state: | |
| "benefit of eating eggs" | |

-continued

| System: | Eggs are a very good source of protein |
| --- | --- |
| User: | You don't seem to have done your best job. |
| System:<br>negative sentiment detected.<br>change of belief state to other alternative:<br>2) "amount of eggs to be eaten" | |
| System: | The more eggs you eat the more protein you get. |
| User: | But it can also raise cholesterol. |
| System:<br>negative sentiment detected.<br>Controversy detection run . . .<br>Controversy in the topic detected:<br>"at most 5 eggs per week" vs.<br>"at least one egg per day"<br>New belief state:<br>"at most 5 eggs per week" | |
| System: | Recent articles indicate it is safe to eat at most 5 eggs per week. |
| User: | Agreed. |

Figure 4:
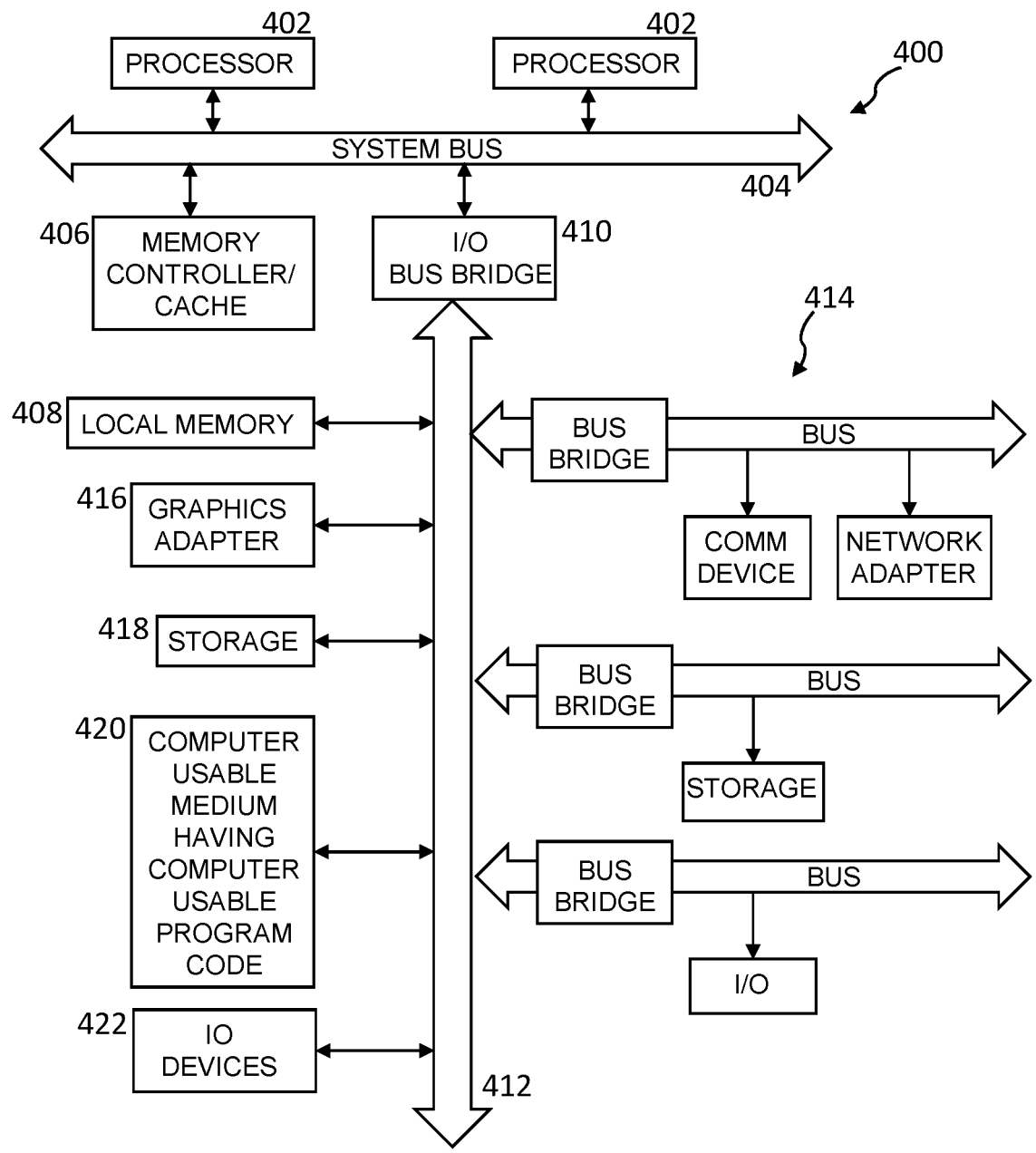
FIG. 4 depicts a block diagram of a data processing system in accordance with the present disclosure.

Referring to FIG. 4, a block diagram of a data processing system is depicted in accordance with the present disclosure. A data processing system 400, such as may be utilized to implement the hardware platform 102 or aspects thereof, e.g., as set out in greater detail in FIG. 1, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The data processing system 400, such as may also be utilized to implement the QA system 102, or aspects thereof, e.g., as set out in greater detail in FIG. 1 and FIG. 3.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing, by a computer, a question answering service;
detecting, by the computer, a negative sentiment of a user to an answer transmitted by the computer to a device associated with the user;
performing, responsive to detecting the negative sentiment and by the computer, controversy detection using a plurality of data sources and based upon a topic related to the answer;
determining, by the computer and based upon the controversy detection, that a controversy related to the topic exists;
adding, by the computer, a new belief state to the question answering service based on the controversy; and
transmitting, by the computer, an updated answer to the device, wherein
the updated answer is based on the new belief state.

2. The method of claim 1, further comprising:
receiving, by the computer, a question from the user device;
determining, by the computer, a first belief state of the question answering service, wherein
the first belief state is determined based on the question received from the device; and
transmitting, by the computer, a first answer to the device based on the first belief state, wherein
the first answer and the answer for which the negative sentiment is detected are the same.

3. The method of claim 2, wherein
the first belief state and the new belief state are semantically contrary to one another.

4. The method of claim 1, further comprising:
receiving, by the computer, a question from the user device;
determining, by the computer, a first belief state of the question answering service, wherein
the first belief state is determined based on the question received from the device; and
transmitting, by the computer, a first answer to the device based on the first belief state;
detecting, by the computer, a first negative sentiment of the user to the first answer;
responsive to detecting the first negative sentiment, selecting, by the computer, a second belief state of the question answering service based on the question received from the device; and
transmitting, by the computer, a second answer to the device based on the second belief state, wherein
the second answer and the answer for which the negative sentiment is detected are the same.

5. The method of claim 4, wherein
the first belief state and the second belief state are alternative belief states of the question answering for the received question.

6. The method of claim 4, wherein
the second belief state is utilized by reinforcement learning algorithms of the question answering service.

7. The method of claim 1, wherein
detecting the negative sentiment comprises:
receiving, by the computer, from the user device a response to the answer transmitted by the computer to the device associated with the user; and
analyzing, by the computer, the response to the negative sentiment.

8. The method of claim 1, further comprising
determining, by the computer, when content exists that is semantically contrary to the answer.

9. The method of claim 1, wherein
the adding the new belief state increases a number of belief states in the question answering service as a potential answer to a question to which the answer is a response.

10. The method of claim 1, wherein
the new belief state is utilized by reinforcement learning algorithms of the question answering service.

11. A system, comprising:
a processor programmed to initiate executable operations comprising:
providing a question answering service;
detecting a negative sentiment of a user to an answer transmitted by the system to a device associated with the user;
performing, responsive to detecting the negative sentiment, controversy detection using a plurality of data sources and based upon a topic related to the answer;
determining, by the computer and based upon the controversy detection, that a controversy related to the topic exists;
adding a new belief state to the question answering service based on the controversy; and
transmitting an updated answer to the device, wherein
the updated answer is based on the new belief state.

12. The system of claim 11, wherein
the processor is programmed to initiate executable operations further comprising:
receiving a question from the user device;
determining a first belief state of the question answering service, wherein
the first belief state is determined based on the question received from the device; and
transmitting a first answer to the device based on the first belief state, wherein
the first answer and the answer for which the negative sentiment is detected are the same.

13. The system of claim 12, wherein
the first belief state and the new belief state are semantically contrary to one another.

14. The system of claim 11, wherein
the processor is programmed to initiate executable operations further comprising:
receiving a question from the user device;
determining a first belief state of the question answering service, wherein
the first belief state is determined based on the question received from the device; and
transmitting a first answer to the device based on the first belief state;
detecting a first negative sentiment of the user to the first answer;
responsive to detecting the first negative sentiment, selecting a second belief state of the question answering service based on the question received from the device; and
transmitting a second answer to the device based on the second belief state, wherein
the second answer and the answer for which the negative sentiment is detected are the same.

15. The system of claim 11, wherein the first belief state and the second belief state are alternative belief states of the question answering for the received question.

16. The system of claim 11, wherein the processor is programmed, in order to detect the negative sentiment, to initiate executable operations further comprising:
   receiving from the user device a response to the answer transmitted by the computer to the device associated with the user; and
   analyzing the response to the negative sentiment.

17. The system of claim 11, wherein the processor is programmed to initiate executable operations further comprising:
   determining when content exists that is semantically contrary to the answer.

18. The system of claim 11, wherein the adding the new belief state increases a number of belief states in the question answering service as a potential answer to a question to which the answer is a response.

19. The system of claim 11, wherein the new belief state is utilized by reinforcement learning algorithms of the question answering service.

20. A computer program product, comprising:
   a computer readable storage medium having program code stored thereon, the program code executable by a data processing system to initiate operations including:
      providing, by the data processing system, a question answering service;
      detecting, by the data processing system, a negative sentiment of a user to an answer transmitted by the computer to a device associated with the user;
      performing, responsive to detecting the negative sentiment and by the data processing system, controversy detection using a plurality of data sources and based upon a topic related to the answer;
      determining, by the data processing system and based upon the controversy detection, that a controversy related to the topic exists;
      adding, by the data processing system, a new belief state to the question answering service based on the controversy; and
      transmitting, by the data processing system, an updated answer to the device, wherein
   the updated answer is based on the new belief state.

* * * * *